United States Patent [19]

Wiemeri et al.

[11] Patent Number: 4,848,424
[45] Date of Patent: Jul. 18, 1989

[54] VEHICLE MOUNTABLE TREE FELLING APPARATUS

[75] Inventors: Ronald W. Wiemeri, Owatonna, Minn.; James N. Mitchell, Skippers, Va.

[73] Assignee: Blount, Inc., Montgomery, Ala.

[21] Appl. No.: 179,755

[22] Filed: Apr. 11, 1988

[51] Int. Cl.⁴ ............................................. A01G 23/08
[52] U.S. Cl. ................................. 144/34 R; 83/796; 83/928; 144/3 D; 144/336
[58] Field of Search ................ 83/796, 928; 144/2 Z, 144/3 D, 34 R, 34 E, 335, 336

[56] References Cited

U.S. PATENT DOCUMENTS

| | | |
|---|---|---|
| 3,364,960 | 1/1968 | Collins, Jr. et al. |
| 3,604,479 | 9/1971 | Jordan |
| 3,612,115 | 10/1971 | Albright ............................ 144/34 R |
| 3,848,648 | 11/1974 | Dika et al. ........................ 144/34 R |
| 3,918,476 | 11/1975 | Jasinski .............................. 144/3 D |
| 3,946,775 | 3/1976 | Albright .............................. 144/3 D |
| 3,986,541 | 10/1976 | McLauchlan ..................... 144/34 R |
| 4,153,086 | 5/1979 | Oldenburg ........................ 144/34 R |
| 4,273,169 | 6/1981 | Baenen |
| 4,462,439 | 7/1984 | Dagenais |

FOREIGN PATENT DOCUMENTS 677726 8/1979 U.S.S.R. ............................ 144/34 R

Primary Examiner—W. Donald Bray
Attorney, Agent, or Firm—Klarquist, Sparkman, Campbell, Leigh & Whinston

[57] ABSTRACT

A tree felling apparatus mountable to a vehicle includes a frame defining an opening for receiving a tree and a chain saw mounted for linear movement across the opening for felling the tree. One side of the opening is defined by an anvil having a sharpened edge for increasingly engaging the tree as the frame is advanced to receive the tree within the opening. The sharpened edge also extends sufficiently so that it overlaps the leading edge of the chain saw as the saw completes its cut. The anvil thus serves as a stationary, stable pivot point for the falling tree and protects the underlying chain from the force of the falling tree. Wedges are spaced across the saw bar of the chain saw for directionally felling the tree.

14 Claims, 5 Drawing Sheets

VEHICLE MOUNTABLE TREE FELLING APPARATUS

BACKGROUND OF THE INVENTION

This invention relates to tree felling apparatus such as a chain saw and more particularly to such apparatus mountable to a vehicle for mechanically harvesting trees Over the years a number of types of felling apparatus mountable to a tractor or similar vehicle have been developed for mechanically harvesting trees. One type of apparatus employs hydraulically powered shears for slicing through the tree. Another type of apparatus employs a chain saw that pivotally swings across a defined opening in which a tree is situated.

The primary drawback of shear type apparatus is the damage to the wood fiber caused by the compression required to force the blades laterally through the tree trunk. The tree may also split as the blade nears the end of its normal stroke. Trees with such splits provide a lower overall yield of lumber or pulp chips.

Chain saw type felling apparatus avoids the damage to the trees caused by shears, but such apparatus provided heretofore suffer from other drawbacks. U.S Pat. No. 4,462,439, for example, discloses a chain saw comprising a cutting chain supported on a plate or bar and mounted on the front of a tractor for felling trees. The bar is pivotally attached to a supporting frame which is notched to receive a tree. In cutting a tree positioned within the notch, the saw is hydraulically pivoted through an arc from one edge of the notch into a recess in the opposite side. As the saw nears the end of the cut, the weight of the tree is shifted entirely onto the saw. With repeated usage, this weight can bend the saw bar or damage the chain. Moreover, the saw is pivoted by a linear actuator, which causes the rate of feed of the saw through the tree trunk to vary and produce a nonuniform cut.

U.S. Pat. No. 3,604,479 discloses a similar apparatus in which a chain saw supported on a bar is mounted to the front of a vehicle The saw bar is pivoted across an opening in which the tree is received toward the blunt side of a stationary jaw. As the saw nears the end of its cut, the tree's weight is borne by the saw bar. The saw chain is also unprotected and can be easily damaged from the pivoting action of the falling tree.

Other chain saw type apparatus are disclosed in U.S. Pat. Nos. 3,364,960 and 4,273,169. Both utilize pivotal chain saws that suffer from the drawbacks discussed herein.

SUMMARY OF THE INVENTION

An object of the invention, therefore, is to provide an improved vehicle mountable tree felling apparatus that utilizes a chain saw.

Another object of the invention is to provide such an apparatus that shields the chain saw from damage by the tree being felled.

Another object of the invention is to provide such an apparatus that supports the tree apart from the chain saw.

Yet another object of the invention is to provide such an apparatus that places the pivoting point of a falling tree off the chain saw and onto a stationary, adequately supported point.

Still another object of the invention is to provide such an apparatus that moves the chain saw linearly through the tree to produce a uniform cut.

To achieve these objects, an apparatus according to the invention includes a frame defining an opening for receiving a tree and chain saw means mounted for movement across the opening for felling the tree. On one side of the frame opening, means such as an anvil having a sharpened edge is positioned to engage and support the tree as it is received. On the other side of the opening the chain saw means is initially positioned. As the chain saw means moves across the opening to complete its cut, the anvil means overlaps the chain saw means to protect it from the falling tree.

In the described embodiment, the anvil means comprises an upper anvil having the sharpened edge and a lower adjacent anvil having a blunter edge. The sharpened edge extends beyond the blunt edge in the direction of the chain saw means so that the sharpened edge can penetrate into the tree. The edge of the upper anvil is inclined with respect to the direction of movement of the tractor as a tree is approached so that the sharpened edge slices increasingly further into the tree as the frame is advanced to embrace the tree.

The apparatus also includes wedges affixed to the chain saw means for urging the tree to fall in the direction of the saw chain movement as the tree is cut. A plurality of wedges are provided and are situated on the chain saw means to accommodate trees of different diameters.

The apparatus thus overcomes drawbacks of prior harvesting apparatus by protecting the chain from the falling tree, stabilizing the apparatus as the chain saw cuts through the tree, and shifting the weight of the tree from the movable chain saw means to the stationary saw frame.

The foregoing and other objects, features, and advantages of the invention will become more apparent from the following detailed description of a preferred embodiment which proceeds with reference to the accompanying drawings.

DETAILED DESCRIPTION

Figure 1:
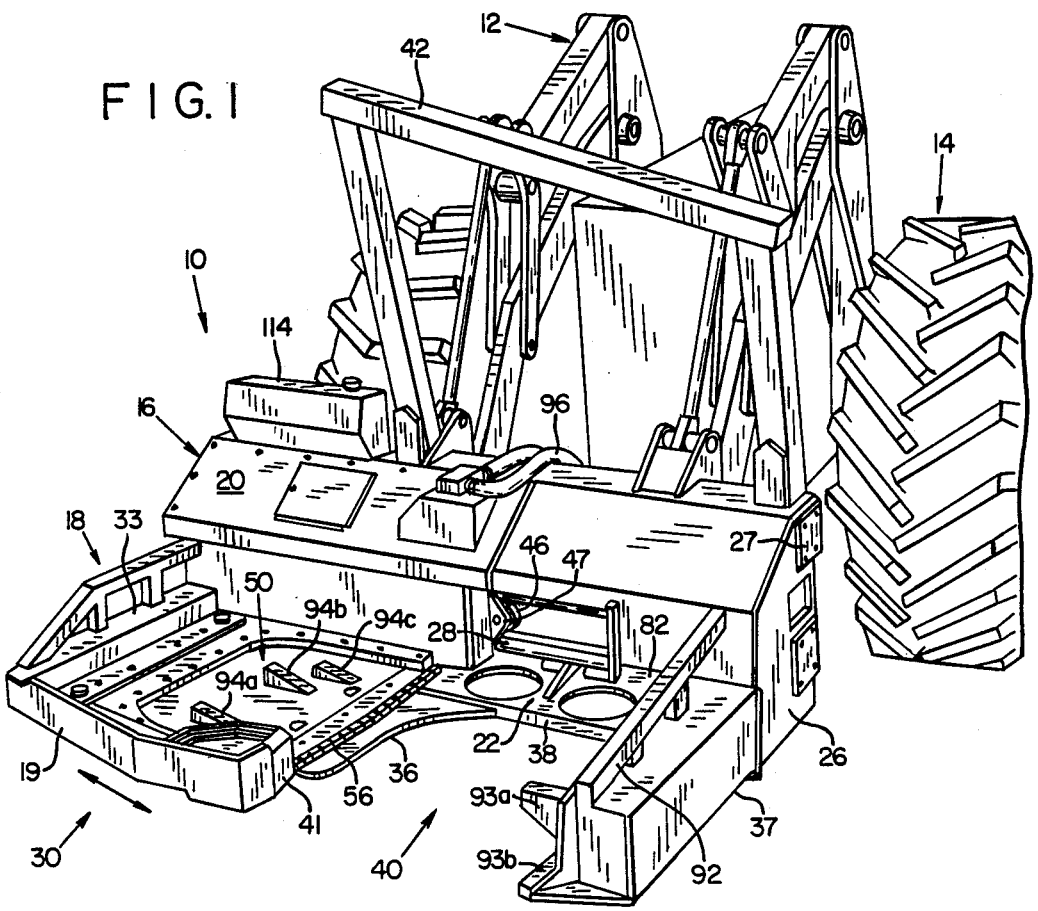
FIG. 1 is a perspective view of a tree felling apparatus according to the invention, shown mounted on the front of a conventional tractor.
Figure 2:
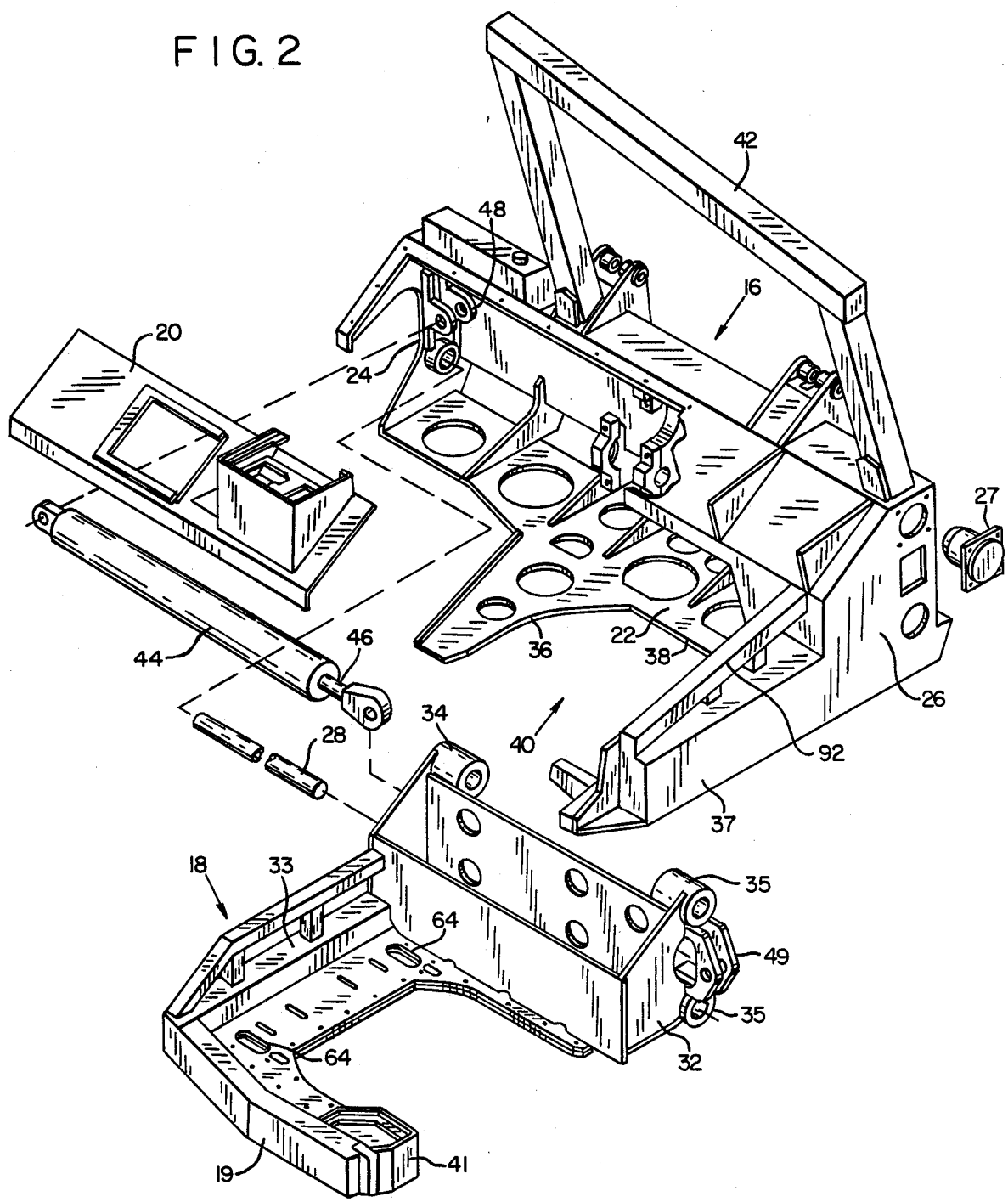
FIG. 2 is an exploded enlarged view of the frame portions of the apparatus.

Referring now to FIGS. 1 and 2, an apparatus 10 according to the invention is shown mounted to a conventional extendable and elevatable framework 12 attached to the front of a tractor 14. The apparatus 10 includes a main frame 16 to which a movable saw mounting frame 18 is mounted. The main frame 16 includes a top member 20 and opposite bottom member 22 extending laterally between opposite end members 24 and 26. Fixed to retainers 27 in the end members 24 and 26 and extending therebetween are a pair of parallel, supporting guide shafts 28 that support frame 18 for lateral back and forth movement, as indicated by arrows 30 in FIG. 1. The saw mounting frame 18 includes a rearward box frame portion 32 which slides beneath the top frame member 20. Mounted on the rear of the frame portion 32 at each end thereof is a pair of bushing lined brackets 34, 35 in which are received the guide shafts 28. The supporting frame 18 includes a forwardly projecting L-shaped arm 33 which, as described hereinafter, defines partially the support for the cutting chain. The arm 33 is opposite a stationary engaging arm 37 included in the frame 16 and extending outwardly from end member 26. Partially overlapped by the frame 18 and shown most clearly in FIG. 2 is a tree limiting arm 36 that extends outwardly from the bottom member 22. The engaging arm 37 and limiting arm 36 define the sides, and a sharpened rear anvil 38 of the bottom member 22 defines the rear, of a saw frame opening 40 within which a tree to be felled is embraced. To cut a tree within the opening 40, the mounting frame 18 is moved linearly across the opening until the tip 41 of the arm 33 interlocks with the engaging arm 37 in a manner to be described.

The main frame 16 also includes an upwardly extending, inclined protective bar 42 mounted atop the top member 20 and along most of the member's length. The incline of the bar 42 is downwardly to the right of the apparatus 10 (as viewed from the front) such that a tree falling toward the tractor 14 is caught and redirected to fall toward the engaging arm 37.

Figure 7:
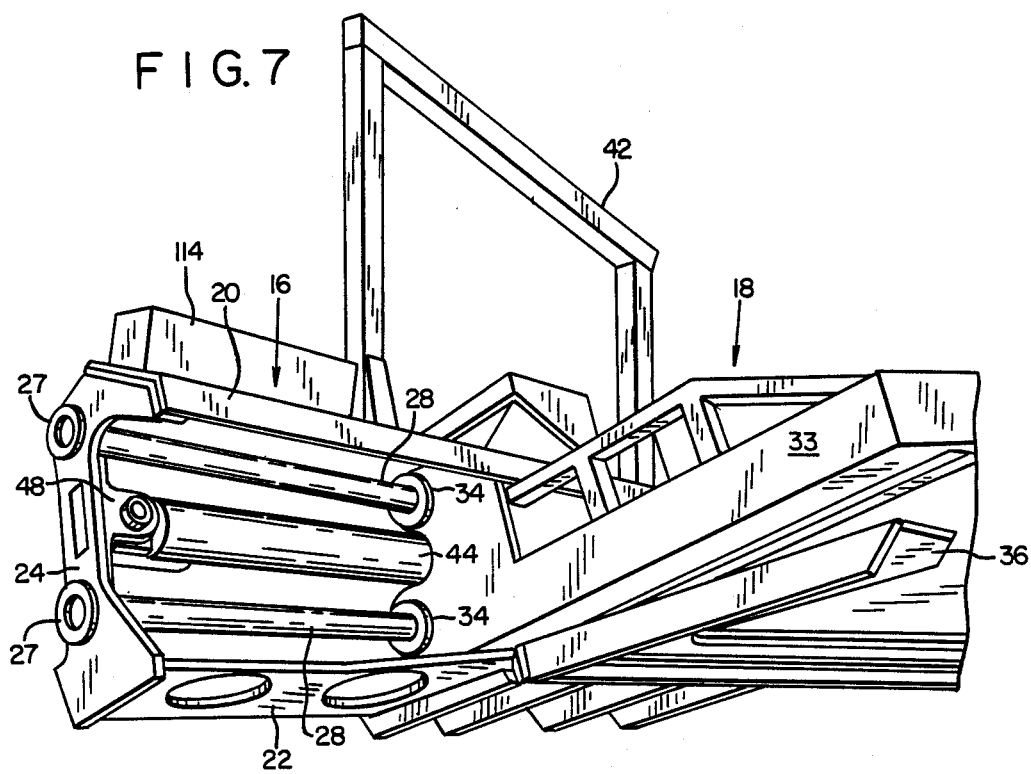
FIG. 7 is a fragmentary perspective view of the apparatus from the underside with the apparatus in its position after cutting through a tree.

Means are provided for moving the saw mounting frame 18 laterally back and forth across the saw frame opening 40. Such means comprise a hydraulic feed cylinder 44 and rod 46 shown in FIG. 2 within the body of the main frame 16. As is best shown in FIG. 7, the base of the cylinder 44 is connected to a supporting bracket 48 mounted on the inside of end member 24 between the shaft retainers 27. The exposed end of the rod 46 connects to a center connection 49 of the bracket 35 (FIG. 2) for pushing and pulling the saw mounting frame 18 along the guide shafts 28. Hydraulic pressure for controlling the cylinder 44 is provided by a hydraulic system via a suitable connection from the tractor 14, as will be discussed.

Figure 3:
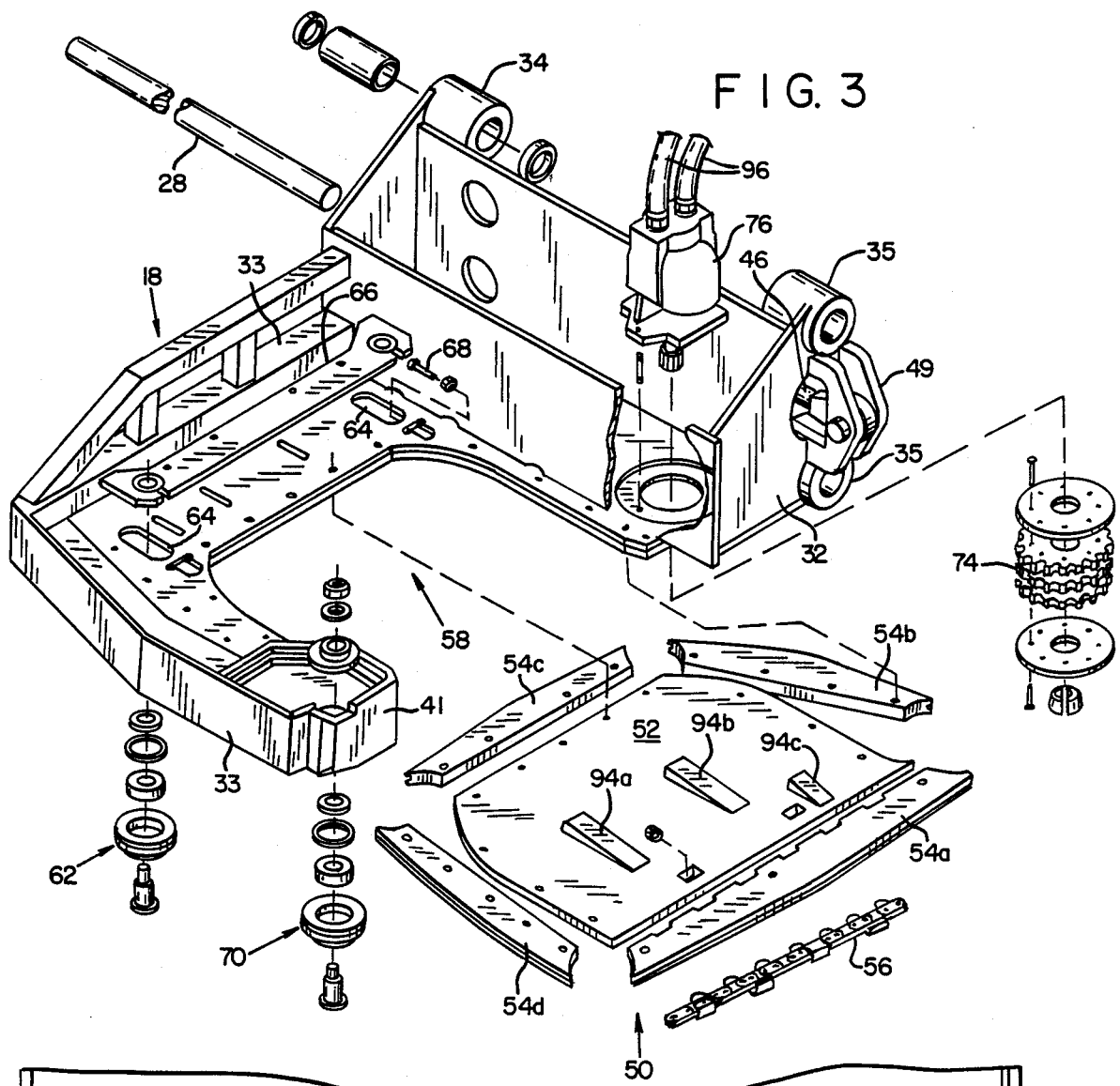
FIG. 3 is an exploded enlarged view of the chain saw portion of the apparatus.

Referring now to FIG. 3, the saw mounting frame 18 supports a chain saw shown at 50 for cutting through a tree embraced within the opening 40. The chain saw 50 comprises a roughly rectangular-shaped saw bar 52 to the periphery of which are attached saw chain guides 54a–54d for guiding a saw chain 56 counterclockwise around the perimeter of the bar. The saw bar 52 is 0.005 to 0.080 inches less in thickness than the width of the saw chain kerf to maximize the strength of the bar and maintain clearance as the bar enters the kerf. The saw chain guide 54a forms the leading edge of the chain saw 50 when the saw moves linearly across the opening 40.

The saw bar 52 and saw chain guides 54a–54d are mounted within a U-shaped notch 58 of saw mounting frame arm 18. At the rear of the notch 58 opposite two corners of the bar 52 are a pair of take-up idlers 62 for guiding the saw chain 56 around those corners of the bar. The idlers 62 are frictionally attached to the frame 18 through take-up slots 64 and a take-up bar 66. Within the slots 64, the idlers 62 are movable via the take-up bar 66 toward and away from the bar 52 to adjust the tension on the chain 56. The chain tension is adjusted by turning a pair of bolts 68 that are threadedly attached to the frame 18 and connected to the take-up bar 66. The chain 56 also passes around a fixed idler 70 adjacent to the tip 41 of the arm 33 opposite a third corner of the saw bar 52. The chain 56 is driven around the saw bar 52 by motor driven sprockets 74 (FIG. 3) mounted adjacent to the fourth corner of the saw bar. The sprockets 74 in turn are driven by the shaft of a hydraulic motor 76 housed within the box frame portion 32 at the rear of the frame 18.

Figure 4A:
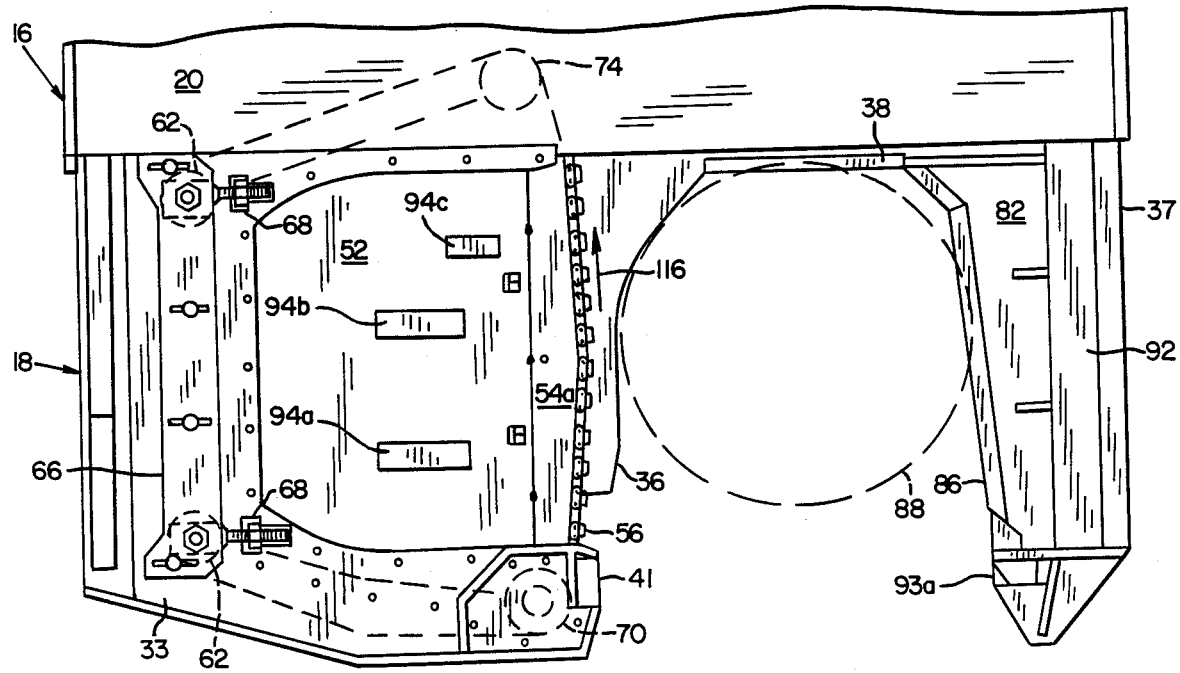
FIG. 4A is an enlarged partial plan view of the apparatus shown in its position before cutting through a tree.
Figure 4B:
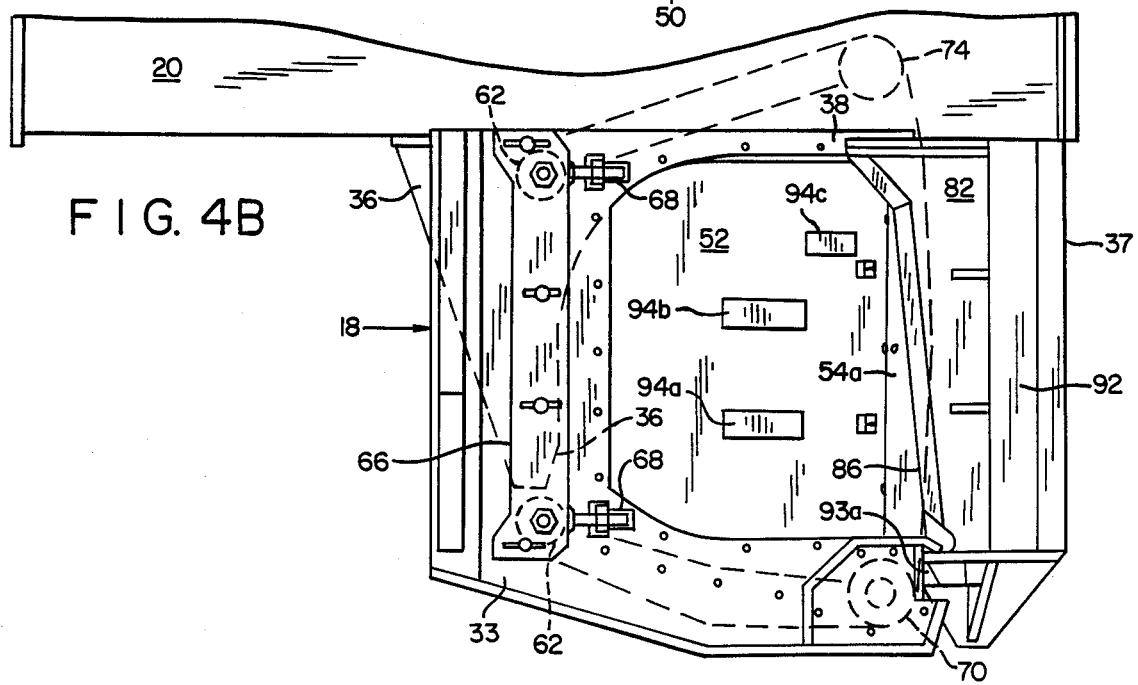
FIG. 4B is an enlarged partial plan view of the apparatus shown in its position after cutting through the tree.
Figure 5:
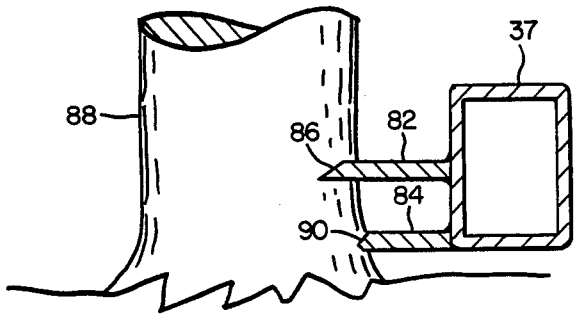
FIG. 5 is a cross-sectional view of an engaging arm of the apparatus for engaging the tree.

Referring now to FIGS. 1 and 4–6, the engaging arm 37 includes on its inner side adjacent to the opening 40 an upper anvil 82 and a lower, parallel anvil 84. The anvils 82, 84 both extend from the rear anvil 38 of the bottom member 22 towards the outer end of the arm 37. The upper anvil 82 includes a sharpened edge 86 that can penetrate a tree 88 for slicingly engaging and supporting the tree as the tree is embraced in the saw frame opening 40. As best seen in FIG. 4, the anvil 82 increases in width from the front toward the rear of the opening 40 adjacent to and above the rear anvil 38. The sharpened edge 86 thus is inclined with respect to the direction of movement of the tractor 14 and is increasingly embedded in the tree 88 as the frame 16 of the apparatus is advanced. Immediately below edge 86 the lower anvil 84 terminates in a blunter edge 90 that does not extend outwardly as far as the sharpened edge 86, as indicated in FIG. 5. The edge 90 and rear anvil 38 penetrate the tree 88 to a lesser degree than the edge 86 and with the opposite arm 36 serves as a limiter to the size of the tree engaged. Hence, only trees of a diameter that can be fully cut through by the chain saw 50 can enter the opening 40.

Figure 6:
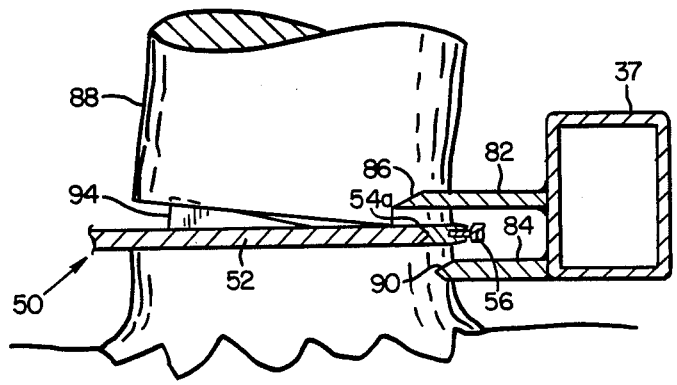
FIG. 6 is a cross-sectional view of the engaging arm shown in FIG. 5 overlapping the chain saw portion as the chain saw completes its cut through the tree.

The anvils 82, 84 have an additional function. As shown in FIG. 6, the upper anvil 82 and lower anvil 84 straddle the plane of the saw bar 52 and chain 56. This spatial arrangement of the anvils allows the chain and saw bar to penetrate between the anvils to such an extent that the anvils overlap the leading edge of the chain saw 50 as the saw completes its cut. The overlap protects the chain 56 and bar 52 from the full weight of the tree 88 and its pivotal action as it falls. Some of the weight instead is borne by the upper anvil 82, which provides a stable pivot point for the tree as it falls after severing by the saw 50.

The upper anvil 82 thus acts to support the tree 88, stabilize the frame 16 with respect to the tree, and shield the underlying saw chain 56 and saw bar 52 from damage otherwise caused by the force of the falling tree. The lower anvil 84 limits the penetration of the sharpened edge 86 on the upper anvil to a desired depth, prevents (with limiter arm 36) the attack of trees larger than can be severed by the saw 50, and with rear anvil 38 assists in stabilizing the frame 16 during the cutting action of the chain saw 50.

The engaging arm 37 also includes other features important to the apparatus 10. As best seen in FIGS. 1 and 2, an inclined shoulder 92 slopes from the end member 26 downwardly toward the outer end of the arm. This shoulder 92 directs falling trees away from the main frame 16 of the apparatus and the tractor 14. Additionally, the outer end of the arm 37 terminates beyond the anvils 82, 84 in a catch defined by vertically aligned retainers 93a-93b. Theses retainers interlock the arm 37 (and thus the main frame 16) with the tip 41 of the arm 33. This interlock provides increased rigidity to the apparatus 10 once the cut is complete and the felled tree is laying partially on the arm 37.

To direct the fall of the tree to the right side of the tractor 14, as viewed in FIG. 1, and away from the leading edge of the saw 50, three wedges 94a-94c are affixed atop the saw bar 52. The wedges taper toward the leading edge of the chain saw 50 to tilt the tree 88 to the right as it is severed, as indicated in FIG. 6, over the shoulder 92 of the arm 29. The wedge 94c is smaller and positioned near the inner side of the bar 52 and close to the leading edge of the chain saw 50 for engaging and tilting a smaller tree. The wedges 94a, 94b are positioned side by side and further outwardly from the leading edge so as to engage and tilt a larger tree. The wedges 94 also assist on completing engagement of the upper anvil 82 with the tree 88 by pressing against the tree as they enter the saw chain kerf, thus effecting a squeezing action between the wedges and the anvil 82.

FIG. 4A shows in the position of the apparatus 10 with the frame 18 and attached chain saw 50 in the open or tree receiving position. The chain saw 50 is to the left as viewed in FIG. 4A with the leading edge of the saw adjacent to the limiting arm 36. To fell a tree, the frame 18 is pushed to the right as indicated in FIG. 4B across the opening 40 so that the leading edge of the saw will pass through the tree 88 to the side defined by the engaging arm 37. On reaching the engaging arm 37, the mounting frame 18 interlocks with the arm 37 as described. Once the felled tree is removed from the apparatus, the mounting frame 18 is pulled back across the opening 40 to the open position for embracing another tree.

A power source of hydraulic fluid under pressure for the apparatus, represented by the hoses 96 in FIGS. 1 and 4, is provided by the tractor 14. The power source furnishes both feeding power for moving the chain saw 50 across the opening 40 and cutting power for driving the saw chain 56 through a tree. The amount of cutting power required is a function of the tree species, tree size, operating temperature, and saw chain sharpness. In the present embodiment, both the feeding power and the cutting power are operator controlled.

Figure 8:
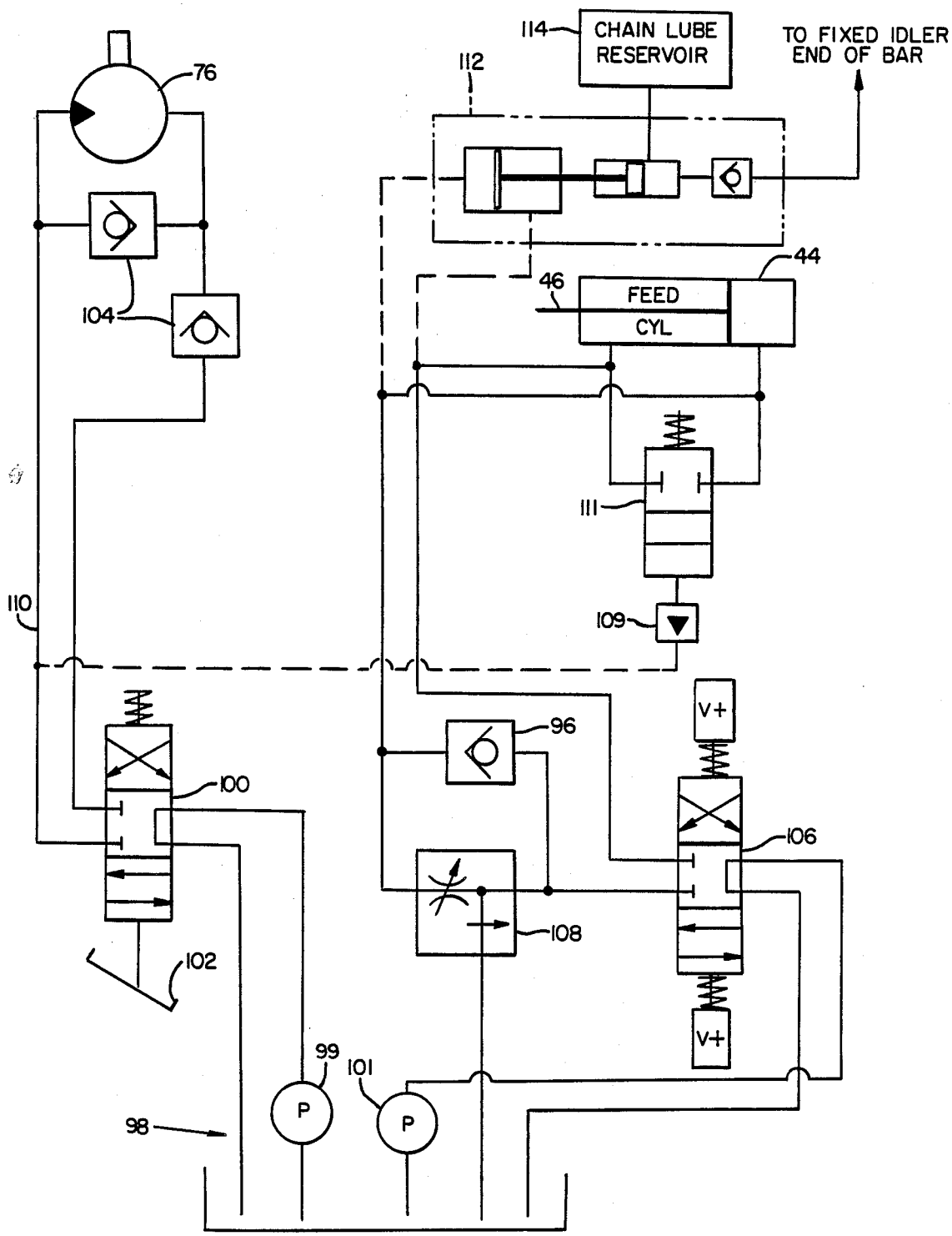
FIG. 8 is a schematic diagram of the hydraulic system of the apparatus.

FIG. 8 is a schematic diagram of the hydraulic system of the apparatus 10. The hydraulic power source 98 of the tractor 14 comprises two independent pumps 99 and 101. The pump 99 pumps hydraulic fluid to the saw motor 76 via a directional valve 100 that is responsive to operator control via a foot pedal 102. A pair of check valves 104 in the hydraulic lines is provided near the motor 76 to operate the motor in a single direction and without cavitation. The movement of the feed cylinder 44 is controlled by an operator controlled directional valve 106 that controls fluid flow from the second pump 101. The directional valve 106 controls whether the cylinder 44 advances or retracts the frame 18 and attached chain saw 50 across the opening 40. A regulating valve 108 controls the hydraulic flow rate in the lines and thus controls the rate at which the cylinder 44 advances the arm 18. A check valve 107 connected in parallel with the regulating valve 108 enables the cylinder 44 to retract quickly when the direction and pressure of the hydraulic flow is reversed to draw fluid from the top of the cylinder.

The operator actuates the chain saw 50 to cut by pressing on pedal 102 to supply pressurized fluid to the saw motor 76. The operator regulates the feed rate by actuating the directional valve 106 and regulating valve 108 to supply pressurized fluid to the cylinder 44 to feed the chain saw 50 across the opening 40 at a desired rate.

Means are provided for sensing the hydraulic pressure on the motor 76 as it drives the saw chain 56 through the tree. Such means comprise a pilot 109 that senses the pressure in the hydraulic line 110 to the motor 76. Means responsive to the pilot 109 are also provided for limiting the rate of movement of the chain saw 50 across the frame opening 40 if the hydraulic pressure exceeds a preselected maximum pressure. Such means comprise a directional relief valve 111 in communication with the pilot 109 and connected in parallel with the cylinder 44. At the preselected pressure level that may cause the motor 76 to stall, the valve 111 responds to divert hydraulic fluid from the base of cylinder 44 back to the directional valve 106. The diversion stops the advance of the chain saw 50 across the opening 40 and through the tree. Once the pressure on the motor 76 decreases below the preselected threshold, the directional valve 111 again allows the hydraulic fluid to flow to the base of cylinder 44. In this manner the hydraulic fluid flow to the the motor 76 is adjusted to be at the maximum allowable to accommodate the pressure load placed thereon.

The hydraulic system also drives a metered lubrication pump 112 for lubricating the saw chain 56. The pump 112 is activated once each time the cylinder 44 is advanced by sensing the accompanying increase in hydraulic pressure. The pump 112 responds by pumping lubricating oil from a reservoir 114 (also shown pictorially in FIG. 1) to the fixed idler 70. The lubricating oil discharges into a groove of the saw chain guide 54a adjacent to the fixed idler 70. This discharge location maximizes the effect of the lubrication on the chain 56 as it is about to enter the the tree, as indicated by the arrow 116 in FIG. 2.

The apparatus 10 operates as follows. With the saw mounting frame 18 retracted to the open position as shown in FIG. 1, the tractor is advanced to position the main frame 16 with a tree 88 embraced within the frame opening 40. In postioning the frame 16, the operator causes the upper anvil 82, lower anvil 84, and rear anvil 38 to engage the tree, as shown in FIGS. 4 and 5. With the anvils so engaged, the operator actuates the saw directional valve 100 to power the motor 76 and drive the saw chain 56. The operator advances or feeds the chain saw 50 into the tree by actuating the directional valve 106 and regulating valve 108. The resultant increase in hydraulic pressure pushes out the rod 46 of the feed cylinder 64 and advances the saw mounting frame 18. The rate of advance or feed of the saw 50 is then regulated manually via the regulating valve 108.

As the saw chain 56 initially enters the tree 88, the saw feed is usually set at a maximum rate for minimizing the cutting time. However, as the cutting of the chain 56 approaches the midway cut of the tree, the greater width of the tree places an increasing pressure load on the motor 76. To prevent stalling, the operator normally reduces the saw feed rate by adjusting regulating valve 108 to apportion more of the hydraulic power from the hydraulic cylinder 44 to the motor 76. Once the chain 56 passes through the center of the tree and the pressure load decreases, the saw feed rate is again increased because the motor 76 now requires less cutting power.

As the chain saw 50 advances through the tree, the wedges 94 enter the saw chain kerf as illustrated in FIG. 6. The engagement of the wedges 94 with the tree further engage the upper anvil 82 and lower anvil 84 into the tree 88 and begin to tilt the tree. When the chain saw 50 nears completion of the cut, the tip 41 of the saw mounting frame 18 engages the retainers 93 of the engaging arm 37 to interlock the frame 18 and frame 16. The interlocked frames shield the chain 56 from the pivoting action of the tree. At the point of a completed cut, the tree is supported both by the saw bar 52 and the stationary, stable anvil 82. As the cut is completed and the tree tilted by the wedges 94, the tree pivots on the anvil 82 and falls across the shoulder 92 of the arm 37.

After the fall, the butt of the tree is normally laying on the interlocked frames. The operator can now actuate the framework 12 to lift the butt of the tree and bunch the tree with other felled trees.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A tree felling apparatus mountable on a vehicle, comprising:
   a frame defining an opening therein for receiving a tree to be felled, the opening having an open front and enclosed sides and rear;
   an upper anvil means mounted on said frame at a first side of said opening and having a sharpened edge thereon for engaging and supporting the tree as the tree is received in the frame opening;
   chain saw means mounted for movement substantially horizontally in a plane below said upper anvil means across the saw frame opening from a second side opposite said first side for felling the tree received therein; and
   a lower anvil means positioned below said plane adjacent to the upper anvil means and having a blunter edge for penetrating the tree to a lesser extent than the upper anvil means to support and stabilize the frame as the chain saw means cuts through the tree, the sharpened edge of the upper anvil means extending beyond the blunter edge of the lower anvil means in the direction of the chain saw means, said upper and lower anvil means being positioned so as to overlap the chain saw means as the chain saw means completes its movement across the frame opening to fell the tree, said upper anvil means supporting the tree when it is severed and functioning as a pivot base for the tree as it falls.

2. The tree falling apparatus of claim 1 in which the chain saw means is mounted for linear movement across the frame opening.

3. The tree falling apparatus of claim 1 in which the sharpened edge of the upper anvil means is inclined with respect to the direction of movement of the frame in embracing the tree within the opening so that the sharpened edge increasingly engages the tree as the frame is advanced to embrace the tree.

4. The tree felling apparatus of claim 1 in which the chain saw means has a leading cutting edge and the apparatus includes wedge means affixed to the chain saw means and tapering downwardly toward the leading cutting edge for urging the tree to fall in a direction away from the leading cutting edge as the chain saw means moves across the frame opening to sever the tree.

5. The tree felling apparatus of claim 1 in which the chain saw means comprises:
   a saw chain;
   saw bar means for operatively supporting the saw chain as it is driven; and
   a saw mounting frame movably mounted to the saw frame for linear movement across the saw frame opening, the saw mounting frame being adapted to support the saw bar means with the saw chain as a leading edge in crossing the opening.

6. The tree felling apparatus of claim 5 in which the thickness of the saw bar means is less than the kerf of the saw chain to enable the saw bar means to pass through the tree as the tree is being felled.

7. The tree falling apparatus of claim 1 including:
   a saw chain within the chain saw means for cutting through the tree;
   hydraulic motor means for driving the saw chain;
   means for sensing the hydraulic pressure on the motor means as it drives the saw chain through the tree; and
   means responsive to the pressure sensing means for limiting the rate of movement of the chain saw means across the frame opening if the hydraulic pressure on the motor means exceeds a preselected maximum pressure.

8. A tree falling apparatus mountable on a vehicle, comprising:
   a frame defining an opening therein for receiving a tree to be felled, the frame opening having an open front and enclosed sides and rear and having stationary and movable arms;
   anvil means mounted to the stationary arm of the frame having a sharpened edge inclined with respect to the direction of movement of the frame in embracing the tree within the opening, the sharpened edge slicing increasingly into the tree as the frame is advanced;
   chain saw means mounted to the movable arm of the frame for linear movement across the frame opening into overlapping relation with the anvil means; and
   retaining means mounted to the outer end of the stationary arm for rigidly interlocking the stationary arm with the movable arm as the movable arm completes its movement.

9. The tree felling apparatus of claim 8 in which the anvil means extends to overlap and protect the chain saw means as the chain saw means completes its movement across the frame opening to fell the tree.

10. The tree felling apparatus of claim 8 in which the anvil means comprises an upper anvil having the sharpened edge and a lower anvil having a blunter edge, the lower anvil extending into the opening sufficiently to limit the size of tree that can enter the opening to a tree that can be cut completely by the chain saw means.

11. The tree felling apparatus of claim 8 in which the chain saw means is mounted adjacent to the side of the saw frame opening opposite the anvil means for movement across the opening to fell the tree.

12. A tree felling apparatus mountable on a vehicle, comprising:
  a frame defining an opening therein for receiving a tree to be felled, the frame opening having an open front and enclosed sides and rear and having stationary and movable arms;
  upper anvil means mounted to the stationary arm of the frame and defining a side of the opening, the upper anvil means increasing in width from the front towards the rear of the opening and having a sharpened edge thereon for increasingly engaging and supporting the tree as the frame is advanced to embrace the tree within the frame opening;
  chain saw means mounted to the movable arm of the frame and having a leading cutting edge and mounted adjacent to the side of the opening opposite the upper anvil means for linear movement across the frame opening into overlapping relation with the upper anvil means;
  lower anvil means mounted to the stationary arm adjacent to the upper anvil means and having a blunter edge for penetrating the tree to a lesser extent than the upper anvil means to support and stabilize the frame as the chain saw means cuts through the tree, the sharpened edge of the upper anvil extending beyond the blunter edge of the lower anvil in the direction of the chain saw means;
  retaining means mounted to the outer end of the stationary arm for rigidly interlocking the stationary arm with the movable arm as the movable arm completes its movement; and
  wedge means affixed to the chain saw means and tapering downwardly toward the leading cutting edge for urging the tree to fall toward the one side as the chain saw means moves across the frame opening,
  the upper and lower anvil means being positioned to overlap and protect the chain saw means as the chain saw means completes its movement across the frame opening to fell the tree.

13. The tree felling apparatus of claim 12 including an inclined shoulder mounted to the stationary arms and sloping downward toward the outer end of the arm for directing a falling trees away from the frame.

14. The tree felling apparatus of claim 12 including an inclined bar means mounted across the frame and sloping in the direction of the movement of the chain saw means for directing a falling tree away from the frame.

* * * * *